United States Patent [19]

Tokue et al.

[11] Patent Number: 5,174,638
[45] Date of Patent: Dec. 29, 1992

[54] TRACK BELT FOR SNOWMOBILES

[75] Inventors: Minoru Tokue, Isehara; Masaomi Kurihara, Chigasaki, both of Japan

[73] Assignee: The Yokohama Rubber Co., Ltd., Tokyo, Japan

[21] Appl. No.: 728,413

[22] Filed: Jul. 11, 1991

[30] Foreign Application Priority Data

Jul. 12, 1990 [JP] Japan .................. 2-182830

[51] Int. Cl.$^5$ ............................................. B62D 55/24
[52] U.S. Cl. ................................. 305/35 EB; 305/16; 305/38
[58] Field of Search ............ 305/16, 24, 35 R, 35 EB, 305/38, 39, 53, 56

[56] References Cited

U.S. PATENT DOCUMENTS

| | | | |
|---|---|---|---|
| 4,023,865 | 5/1977 | Morissette | 305/35 EB |
| 4,217,006 | 8/1980 | Dehnert | 305/35 EB |
| 4,474,414 | 10/1984 | Tokue | 305/56 X |
| 4,991,911 | 2/1991 | Blais | 305/35 EB X |

*Primary Examiner*—Russell D. Stormer
*Attorney, Agent, or Firm*—Nikaido, Marmelstein, Murray & Oram

[57] ABSTRACT

A track belt for snowmobiles equipped with metal guide clips that are disposed on the outer peripheral of reinforcing rods crossing the gaps between belt sections through a rubber layer. Each guide clip includes a main guide portion for guiding the lower surface of a guide rail and a flange portion for guiding the side surface of the guide rail, and the flange portion is shaped in an outwardly projecting spherical shape. The outer peripheral edge portion of this spherically shaped flange portion is buried into the side surface of an adjacent drive lug.

3 Claims, 3 Drawing Sheets

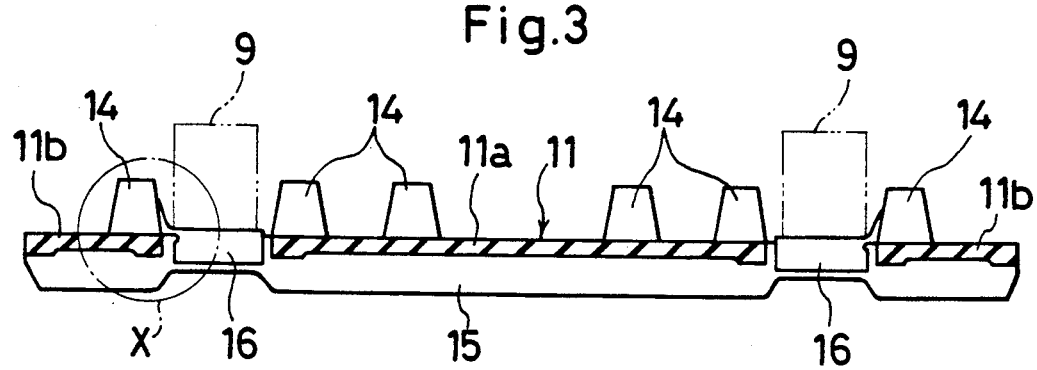
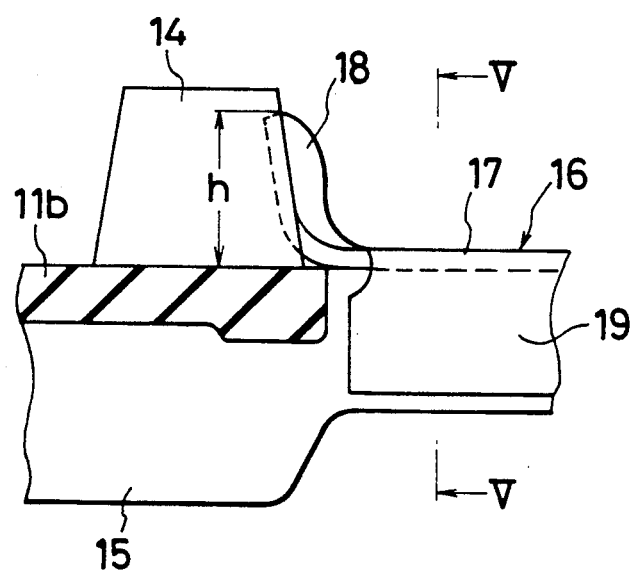
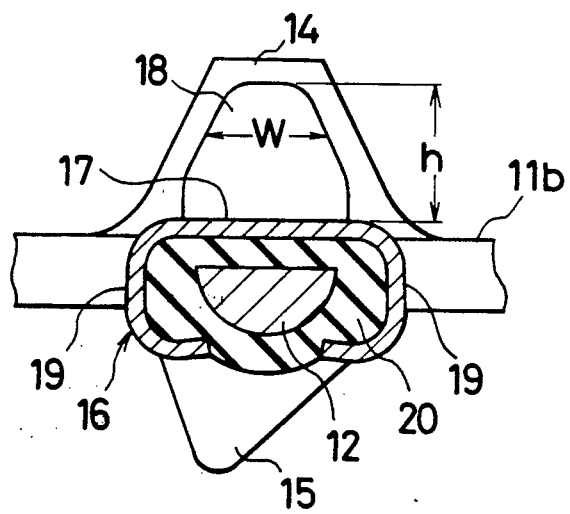

TRACK BELT FOR SNOWMOBILES

BACKGROUND OF THE INVENTION

This invention relates to a track belt for snowmobiles. More particularly, the present invention relates to a track belt for snowmobiles wherein a slide rail for guiding a track belt is not damaged and a contact resistance between the track belt and the slide rail is reduced.

A main body of a track belt for snowmobiles is made of a rubber as its principal component. The track belt is molded in an endless form, is passed around a driving wheel and a driven wheel that are fitted to a car body side, and is driven. To drive such a track belt, a large number, in rows and columns, of drive lugs for engaging with the driving wheel are disposed on the inner peripheral surface of the track belt in a peripheral direction of the belt at a pre-determined pitch. In order to guide the track belt by two right and left metal guide rails supported on the car body side and extending in the belt peripheral direction, a large number of guide clips are fitted in the belt peripheral direction at a predetermined pitch.

As described in U.S. Pat. Nos. 4,023,065 and 4,217,006, the guide clip has a main guide portion for guiding the lower surface of the guide rail, and is equipped one of the sides of this main guide portion with a flange portion for guiding the side surface of the guide rail. The guide clip is fitted in such a manner that its flange portion extends along the side surface of the drive lugs.

In the conventional guide clip of U.S. Pat. No. 4,023,865, its flange portion is shaped in a planar form and the guide clip is fitted under the state where the outer peripheral edge of its flange portion is exposed on the lug surface. Therefore, when the snowmobile turns quickly and the side surface of the guide rail is brought into strong sliding contact with the flange portion of the guide clip, its plain flange portion generates a great frictional resistance and impedes a smooth turning motion. When the snowmoble jumps up greatly, the guide rail sometimes floats up from the guide clips and then comes once again into contact with the guide clips. At the time of this re-contact, the guide rail is scraped off by the edge at the outer peripheral portion of the flange portion and is damaged from time to time.

In the case of the guide clips of the latter reference, i.e. U.S. Pat. No. 4,217,006, the upper end of the flange portion is fitted in such a fashion that its upper end portion is bent outward and the bent portion covers the upper surface end portion of the drive lugs. Therefore, in the case of this guide clip, too, the edge at the upper end of the flange portion is exposed on the surface of the drive lugs and when the snowmobile jumps greatly, the guide rail is damaged often by the edge at the upper end of the flange portion.

SUMMARY OF THE INVENTION

It is an object of the present invention to provide a track belt for snowmobiles free from the problems that when a snowmobile quickly turns or jumps, a slide rail receives a large frictional resistance and its turning motion becomes unsmooth, and comes into contact with the peripheral edge of the flange portion of the guide clips and is damaged.

The track belt for snowmobiles in accordance with the present invention for accomplishing the objects described above is characterized in that the outer surface of the flange portion of guide clips for guiding guide rails is shaped in a spherical form projecting outward, and the outer peripheral edge of this flange portion is buried in the surface of drive lugs.

Since the surface of the flange portion is shaped in the outwardly projecting spherical form as described above, the guide rails substantially come into point contact with the flange portion, and the generation of the large frictional resistance can be prevented. Therefore, the motion when the snowmobile rapidly turns can be made smooth. Since the outer peripheral edge of the flange portion is buried inside the drive lugs, the damage to the guide rails by the outer peripheral edge of the flange portion when the snowmobile jumps up and the guide rails float up from the guide clips and come again into contact with them can be eliminated.

BRIEF DESCRIPTION OF THE DRAWINGS

FIG. 3 is a view when viewed along line III of FIG. 2;

FIG. 4 is an enlarged view of an X portion of FIG. 3;

FIG. 5 is a view when viewed along V—V of FIG. 4;

DETAILED DESCRIPTION OF THE PREFERRED EMBODIMENTS

Figure 1:
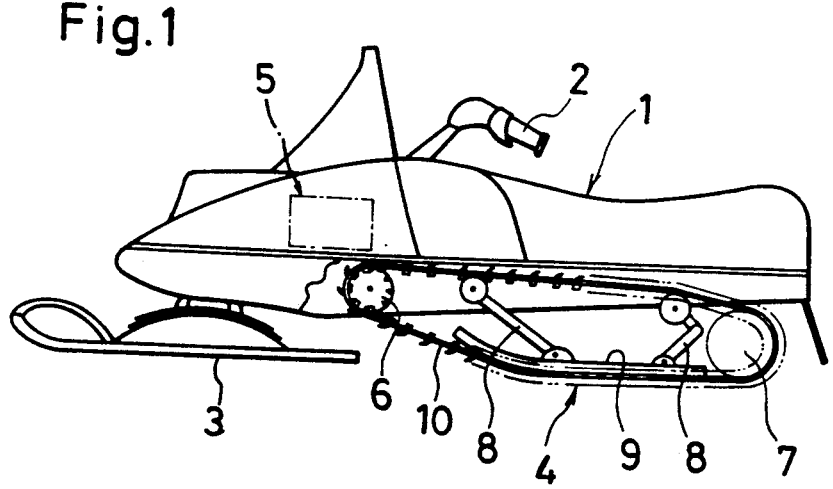
FIG. 1 is a side view showing an example of the snowmobile to which the track belt of the present invention is fitted.

In a snowmobile shown in FIG. 1, steerable skis 3 are shown disposed at the lower part of a car body 1 on its front side, and tracks 4 are disposed on the rear side. The steerable skis 3 are operated by a handle bar 2. The track 4 includes a track belt 10 in accordance with the present invention which is passed endlessly around a driving wheel 6 driven by an engine 5 and a driven wheel 7. Two right and left metal guide rails 9 are disposed on this track 4 and are biased downward through a suspension 8, and come into sliding contact with the inner peripheral surface of the track belt 10 through guide clips 16 which will be explained next.

Figure 2:
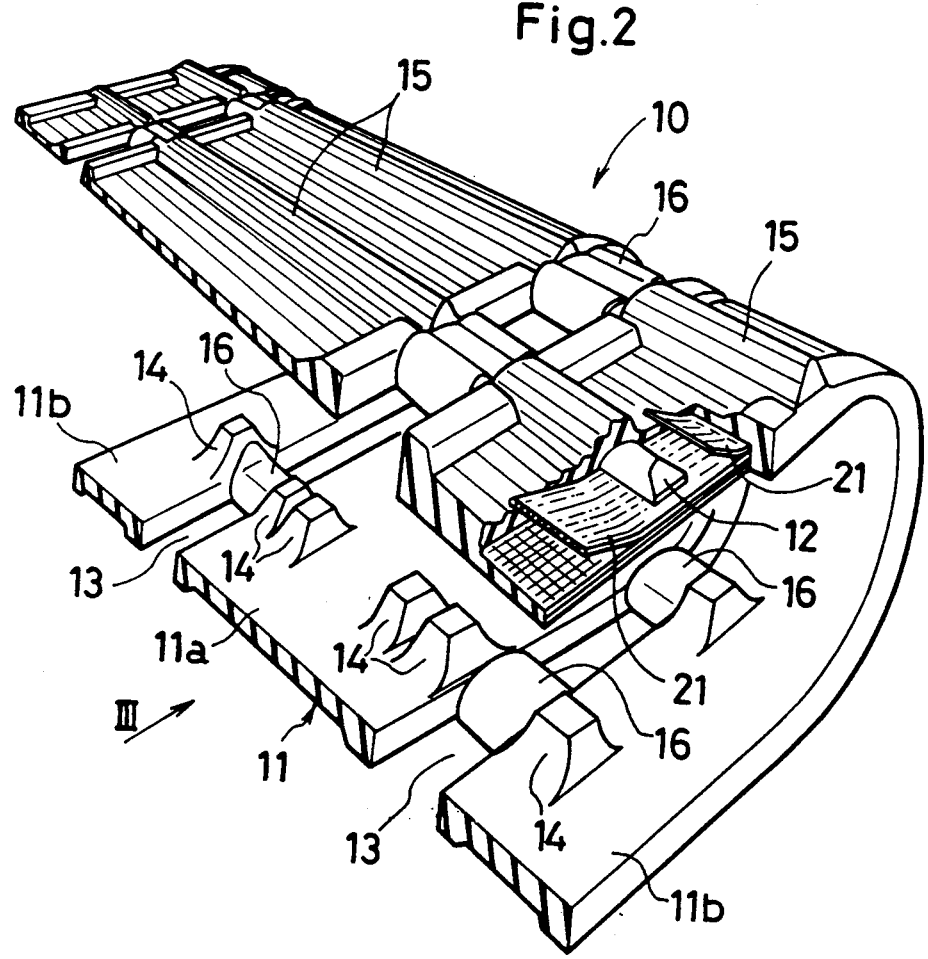
FIG. 2 is a partly cut-away perspective view of the track belt in accordance with an embodiment of the present invention.

As shown in FIGS. 2 and 3, the track belt 10 consists of a belt main body 11 made of a rubber as its principal component and the belt main body 11 includes a wide belt section 11a which is disposed at the center and narrow belt sections 11b, 11b which are disposed on both right and left sides of the wide belt section 11a with a gap 13 between the wide belt section 11a and each narrow belt section 11b. A plurality of reinforcing rods 12 are buried into this belt main body 11 through reinforcing woven fabrics 21 disposed on and beneath the rods 12. These reinforcing rods 12 are buried in such a manner that their belt sections 11a and 11b cross orthogonally the rods in their longitudinal direction, and are disposed at a predetermined pitch in a peripheral direction of the belt.

A large number, in rows and columns, of drive lugs 14 are disposed on the inner peripheral surface of the belt main body 11 at a predetermined pitch in a peripheral direction of the belt so as to correspond to the burying positions of the reinforcing rods 12 described above. Similarly, a large number of traction lugs 15 extending in a widthwise direction of the belt are disposed on the outer peripheral surface of the belt main body 11 at a predetermined pitch in a peripheral direction of the belt in such a manner as to correspond to the burying positions of the reinforcing rods 12. When engaged with the driving wheel 6, the drive lugs 14 drive and rotate the track belt 10, and when engaged with the road surface, the traction lugs 15 generate traction force in the snowmobile.

Guide clips 16 made of a metal are fitted to the portions of the reinforcing rods 12 which cross transversely the gaps 13 between the belt sections, 11a and 11b so as to cover the outside of these exposed rod portions. The guide clips 16 are aligned in columns in the belt peripheral direction and come into sliding contact with the metal guide rails 9 suspended by the car body 1.

Figure 6:
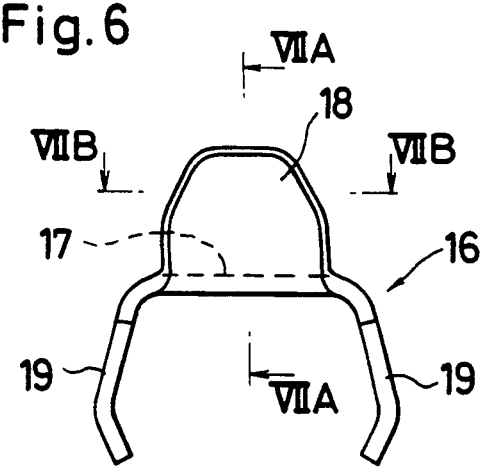
FIG. 6 is a side view of a guide clip used for the track belt of the present invention.
Figure 7A:
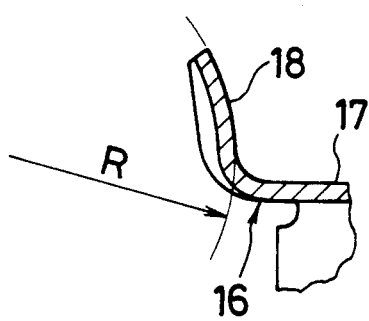
FIG. 7A is a view when viewed along VIIA—VIIA of FIG. 6.
Figure 7B:
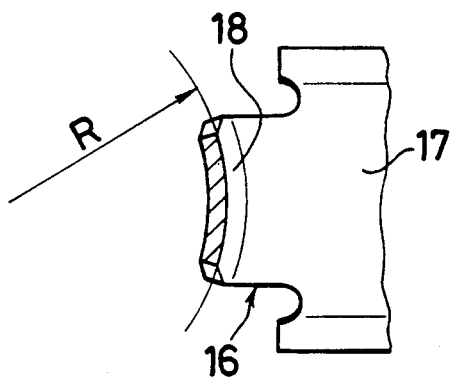
FIG. 7B is a view when viewed along VIIB—VIIB of FIG. 6.

As shown in detail in FIGS. 4 and 5, the guide clips 16 forms a main guide portion 17 for guiding the lower surface of a guide rail 9 in a substantially planar central area. This main guide portion 17 is equipped at one of its ends with an upwardly bent flange portion 18 and on both of its right and left sides, with downwardly bent fixing pawls 19. The upwardly bent flange portion 18 has spherical surface, the edges which project outwardly. The spherical surface of the flange portion 18 has a radius R, as shown in FIGS. 6, 7A and 7B.

Figure 8A:
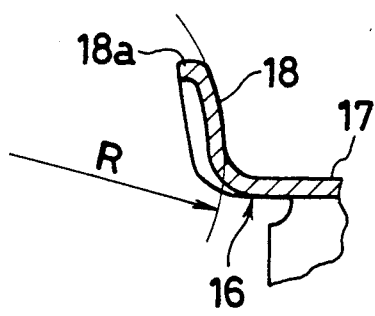
FIG. 8A is a sectional view of a guide clip in accordance with another embodiment of the present invention and corresponds to FIG. 7A.
Figure 8B:
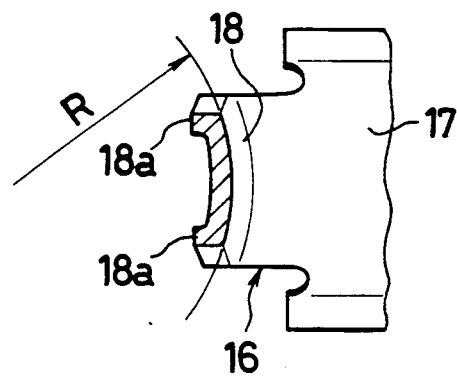
FIG. 8B is a sectional view of a guide clip in accordance with still another embodiment of the present invention and corresponds to FIG. 7B.

When this guide clip 16 having the shape described above is fitted, the main planar guide portion 17 and the fixing pawls 19 on both right and left sides are formed to encircle the outer periphery of the reinforcing rod 12 around a rubber layer 20, the outer peripheral edge of the spherical portion 18 is buried into the side surface of the drive lug 14 and under this state, both fixing pawls 19 are fastened strongly. The height h of the outer peripheral edge of the flange portion 18 is smaller than the height of the drive lug 14 and its width W is always smaller than that of the drive lug 14. The outer peripheral edge of the spherical flange portion 18 abuts the side surface of drive lug 14 and has its edges buried into the side surface of the drive lug 14 as shown in FIG. 4. Besides the shape shown in FIGS. 7A and 7B, a bent portion 18a may be formed by bending outward the upper peripheral edge of the spherical flange portion 18, as shown in FIGS. 8A and 8B. When such a bent portion 18a is formed, the outer peripheral edge of the flange portion 18 can be buried more reliably into the side surface of the drive lug 14.

In the track belt of the present invention having the construction described above, the flange portion of each guide clip is shaped in a spherical form so that its peripheral surface projects outward. Accordingly, when the snowmobile turns rapidly, the side surface of the guide rail coming into contact with the spherical face of the flange portion of the guide clip at the side of the drive lug is allowed to come into a substantially point contact, and the frictional resistance can be therefore reduced. Accordingly, the rapid turning motion of the snowmobile can be made smooth. Since the outer peripheral edges of the flange portions are buried in the drive lugs, the guide rail is not scraped off nor damaged due to its contact with the outer peripheral edge of the flange portion when the guide rail floats up from the guide clips and again comes into contact with them when the snowmobile jumps.

What is claimed is:
1. A track belt for snowmobiles, comprising:
 a belt main body formed by juxtaposing a plurality of belt sections shaped in an endless form with gaps between them;
 a plurality of reinforcing rods buried in said belt main body and spaced in a belt peripheral direction at a predetermined pitch, said rods being positioned so as to cross transversely all of said belt sections;
 a plurality of drive lugs formed in rows and columns on inner peripheral surfaces of said belt sections in the belt peripheral direction at a predetermined pitch; and
 metal guide clips fitted to exposed portions of each of said reinforcing rods crossing transversely the gaps between said belt sections;
 said guide clips each being formed with a main guide portion for guiding a lower surface of a guide rail and a flange portion for guiding a side surface of said guide rail;
 said flange portion of each clip being formed to extend along a side surface of a drive lug disposed adjacent to a gap;
 wherein said flange portion of each of said guide clips is shaped to have a spherical surface with an outer peripheral edge projecting outwardly from said main guide portion, and the outer peripheral edge of said spherical flange portion is buried into the side surface of a respective drive lug.
2. A track belt for snowmobiles according to claim 1, wherein each guide clip flange portion has a height which is smaller than height of its respective drive lug, and a width smaller than width of said drive lug.
3. A track belt for snowmobiles according to claim 1, wherein the peripheral edge of said clip flange portion is bent outward, and said bent portion is buried deeper than the side surface of said drive lugs.

* * * * *